Nov. 5, 1929.  E. UMBECK  1,734,544
EDUCATIONAL DEVICE
Filed Nov. 8, 1927

Inventor
ELLA UMBECK,
By
Attorney

Patented Nov. 5, 1929

1,734,544

UNITED STATES PATENT OFFICE

ELLA UMBECK, OF WASHINGTON, DISTRICT OF COLUMBIA

EDUCATIONAL DEVICE

Application filed November 8, 1927. Serial No. 231,940.

This invention relates to educational devices, and particularly to devices of this character which take the form of a game or puzzle.

A general object of the invention is to provide a device of great educational value and which, at the same time, demands for its successful operation and use such an amount of skill as will tend to arouse and retain the interest of practically all classes of people, regardless of training, age, or education. Specifically, the invention contemplates the provision of a surface upon which is represented the map of a country or state, and in which recesses are formed at the locality of the principal or capital cities thereof. Other natural depressions, such as lakes or rivers, are represented on the surface by recesses considerably larger in size than the cities. A quantity of mercury sufficient to fill each of the city recesses is provided upon the map surface. The objective of the user is to fill each of the cities on the map with the mercury, or as many as possible, and drain the lakes or other natural bodies of water. Owing to the relative large size of the latter and the natural tendency of the mercury to flow therein, the desired result is obtained only with difficulty.

The inventor is aware of prior proposals to provide the surface of a map with grooves or channels within which mercury or balls move in a predetermined path, but regards the present invention as an improvement over such devices. The recesses and depressions on the present map are not connected in any manner, and the map surface is unbroken, except by the recesses. The mercury is thus allowed to move freely and unconfined over the surface of the map, and its movement is controlled solely by the operator.

These and other features of the invention will appear more fully from the following detailed description, when read in connection with the accompanying drawings, and will be pointed out in the appended claims.

Figure 1:
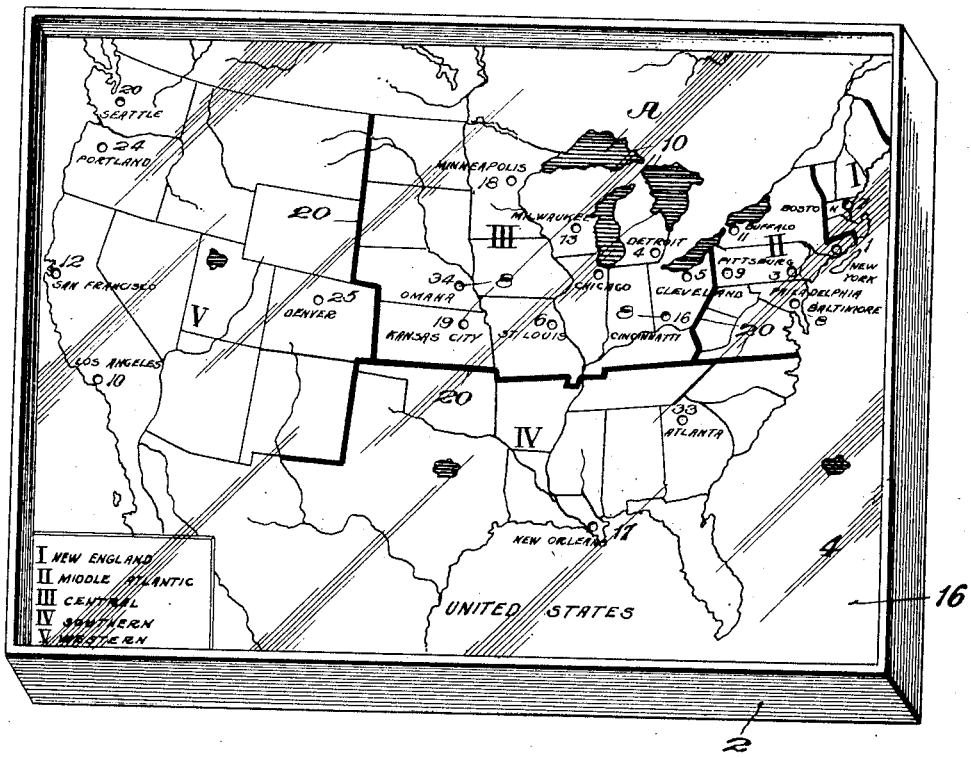
Fig. 1 is a perspective view of the invention.

Referring more particularly to the drawings, 2 represents a box or casing formed from any suitable material, such as wood, cardboard, or metal. The size and shape of the casing will vary with the area and contour of the country which it is designed to inclose. Within the casing is fixed a base member 4, the upper face of which is covered by a map 6 of a state, country, or principality, the illustration being that of the United States of America. The principal cities are accurately located on the map, and denoted by name. At the location of each city, the base member is formed with the recesses 8 adapted to receive a quantity of mercury A for a purpose hereinafter apparent. Inland bodies of water, such as the Great Lakes 10, are formed by relatively deep depressions 12, the upper edges of these being sloped or beveled as at 14 to permit a smooth flow of the mercury into and from the depressions. A suitable quantity of mercury is provided to substantially fill the lake depressions 12 when the cities are empty.

Preferably, the casing is covered by a transparent pane 16 of glass of similar material which will protect the map, and prevent the mercury from falling out or being removed. The cover is spaced from the map a sufficient distance to allow the mercury to roll over the surface of the latter in the manner indicated at 18 in Fig. 2. The cover also serves to prevent the user from touching the mercury, or in any manner aid in guiding the mercury over the map other than by external manipulation of the casing.

Figure 2:
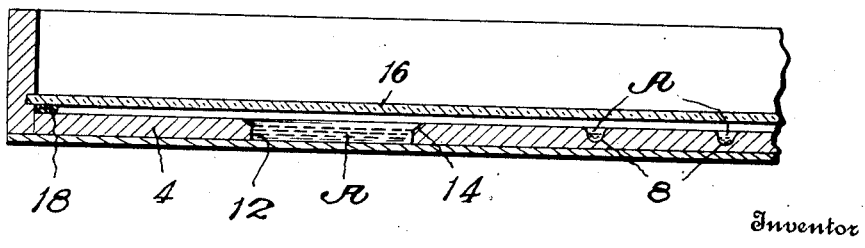
Fig. 2 is a sectional view thereof.

The cover is also but slightly spaced from the surface so that the mercury can move along under the glass, yet when any quantity of mercury is gathered in one spot it will contact with the glass as is clearly shown at 18, Fig. 2. By this construction it is possible to use a large quantity of mercury in the puzzle. In former devices of this kind, where only a small amount of mercury was used, it has been customary to space the top from the surface a considerable distance. However, when large quantities of mercury are used, the puzzle becomes extremely difficult. This is caused by the surface tension of the mercury which is known to be very high. When a mass of mercury lies on a flat surface, it normally takes the form of a flattened sphere, due to this surface tension. Any other mercury brought into contact with the sphere is at once incorporated into the larger body. When a large mass of the mercury passes over a small shallow hole, while some of the mercury may drop into the hole, the surface tension will tend to hold it in the sphere and to pick it up again into the sphere. If the mercury in large masses were free, it would be extremely difficult to fill the small holes where a large quantity of mercury is used. By placing the top close to the surface, the sphere of mercury is flattened. In this way the surface tension is lessened since the glass will exert a downward pressure which will partly neutralize the surface tension. This makes it easier for small particles to break off and fall into the recesses, so that a great number of recesses and a large amount of mercury may be used.

Normally, the mercury occupies the large depressions 12, and simulates the water in the lakes. The problem is to cause the mercury to leave the lakes, roll over the map surface and fill each of the city depressions, this movement of the mercury being produced by shaking, tilting, or otherwise agitating the casing. Naturally, in filling the cities, the user becomes acquainted with the various states and the geographical location of the cities therein.

To further contribute to the educational value, the cities may be numbered in accordance with their rank as to population. Thus, 1 is placed by New York, 2 by Chicago, 3 by Philadelphia. The problem may then take the form of filling the cities successively according to size, and by following the numerals in proper sequence, the user becomes familiar with the relative population and ranking of the various cities. Another advantageous arrangement is to indicate on the map only the capital cities of each state, and thus impart to the user this important geographical information.

The map may also be subdivided by heavy lines 20 into groups I, II, III, IV, and V, the states in these groups constituting the New England, Middle Atlantic, Central, Southern, and Western sections of the country respectively. Various other indications may be placed on the map to indicate geographical facts which every well-informed person should know, and which will be emphatically brought to the attention of the user of the device while the mercury is being manipulated over the surface of the map.

The present invention is valuable not only from the educational standpoint, but requires such an amount of skill in actuation that it is attractive and fascinating as a game. The relatively large size of the lakes, and the constant tendency of the mercury to flow therein makes them effective hazards which are difficult to avoid when attempting to fill the cities. As there are no guiding or confining channels on the surface, the mercury is free to roll in all directions, and in so doing, will invariably break up into a number of small globules or units, the movements of which are hard to control. The task of filling the cities is increased when the order of filling is determined in advance, such as in accordance with size of population.

Having thus described the invention, what I claim as new and desire to secure by Letters Patent of the United States is:

1. A device of the character described having a casing, a base member in said casing, a map upon the upper surface of the base member, the said map having indicia thereon to identify geographical points of interest, the said base member being provided with unconnected recesses adjacent said points, a quantity of mercury adapted to move over the surface of the map and enter said recesses, and a transparent cover for said casing, said cover being spaced from but closely adjacent said surface to contact with the mercury moving over said surface.

2. A device of the character described having a casing, a base member in said casing, a map upon the upper surface of the base member, said map having indicia thereon to identify geographical points of interest, the said base member being provided with relatively small recesses adjacent certain of said points and with relatively large depressions at other points, the said recesses and depressions being isolated and unconnected, a quantity of mercury adapted to move over the surface of the map and enter said recesses and depressions, and a transparent cover for said casing arranged above the base member, said cover being spaced from but closely adjacent said surface to contact with the mercury moving over said surface.

3. A device of the character described having a casing, a base member in said casing, a map upon the upper surface of said base member, said map having indicia to identify cities of the country represented on the map and lakes or other bodies of water, relatively small recesses located in the base member adjacent each city, relatively large depressions at the location of the lakes, a quantity of mercury adapted to enter said recesses and depressions, and a transparent cover for said casing arranged above the base member, said cover being spaced from the surface of said map less than the normal thickness of said mercury when said mercury is gathered into one mass on the surface of the map.

4. A puzzle or educational device consisting of a casing, a base member in said casing, said base member being provided with unconnected recesses, a quantity of mercury adapted to move over the surface of the base member and enter said recesses, and a transparent cover for said casing, said cover being spaced from but closely adjacent said surface to contact with the mercury moving over the surface.

In testimony whereof, I have hereunto set my signature.

ELLA UMBECK.